United States Patent [19]

Stacconi

[11] Patent Number: 4,568,819
[45] Date of Patent: Feb. 4, 1986

[54] PRESSURE-SENSITIVE ELECTRIC SOLDERING/DESOLDERING TOOL

[75] Inventor: Felix A. Stacconi, Endwell, N.Y.

[73] Assignee: General Electric Company, Binghamton, N.Y.

[21] Appl. No.: 451,066

[22] Filed: Dec. 20, 1982

[51] Int. Cl.$^4$ .......................... H05B 3/02; B23K 3/02
[52] U.S. Cl. ..................... 219/227; 219/229; 219/230; 219/236; 219/533; 228/51
[58] Field of Search ............ 219/221, 227–241, 219/533; 101/406; 228/51–55

[56] References Cited

U.S. PATENT DOCUMENTS

| 632,668 | 9/1899 | Alm | 101/406 |
|---|---|---|---|
| 856,915 | 6/1907 | Sauerbier | 101/406 |
| 1,010,529 | 12/1911 | Stevens | 219/227 |
| 1,415,479 | 5/1922 | Putnam | 219/236 |
| 1,708,995 | 4/1929 | Abbott | 219/239 |
| 1,850,280 | 3/1932 | Haynes | 219/227 |
| 2,139,554 | 12/1938 | Martin | 219/229 |
| 2,436,552 | 2/1948 | Cooper | 219/229 |
| 2,554,926 | 5/1951 | Schoenwald | 219/239 |
| 3,526,750 | 1/1970 | Siegel | 219/233 |
| 3,558,854 | 1/1971 | Siegel et al. | 219/233 |
| 3,987,954 | 10/1976 | Litt | 219/230 |
| 4,023,724 | 5/1977 | Wakita et al. | 219/230 |

FOREIGN PATENT DOCUMENTS

| 510918 | 5/1953 | Belgium | 219/229 |
|---|---|---|---|
| 150015 | 8/1981 | German Democratic Rep. | 228/51 |
| 402881 | 3/1943 | Italy | 219/239 |

Primary Examiner—A. Bartis
Attorney, Agent, or Firm—I. David Blumenfeld; Arthur E. Bahr

[57] ABSTRACT

A hand-held electric soldering/desoldering tool has an elongated soldering tip secured to one end of an elongated handle in substantially coaxial alignment therewith by means of a three-point, spring loaded mechanical suspension arrangement resiliently securing the soldering tip to the handle for allowing excessive pressure applied to the handle to be taken up by the spring-loaded suspension thereby preventing such excessive pressure from being applied to a workpiece. The three-point suspension arrangement includes three support members fixed to the handle and having juxtaposed ends passing freely through aligned openings in a support plate attached to the soldering tip. Each support member has a head biased into engagement with the support plate by a coil spring surrounding the support member and disposed between the support plate and handle. Application of excessive pressure causes deflection of the tip from coaxial alignment with the handle, thus providing the operator with a visual indication of excessive pressure application. For desoldering the tip may be provided with a suction bore connected to a suction source in the handle by a flexible coupling arrangement.

6 Claims, 4 Drawing Figures

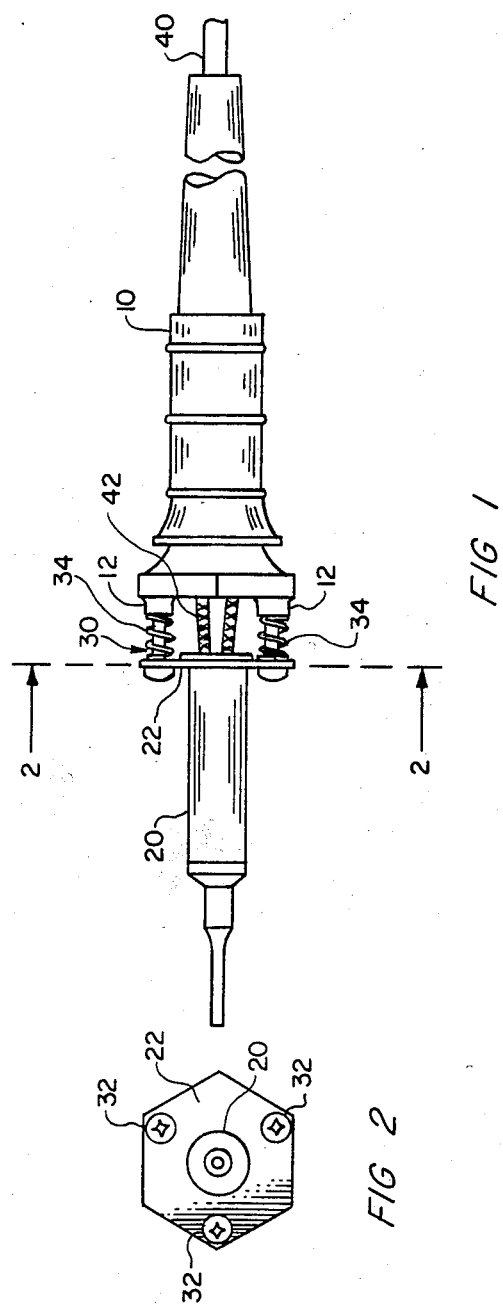

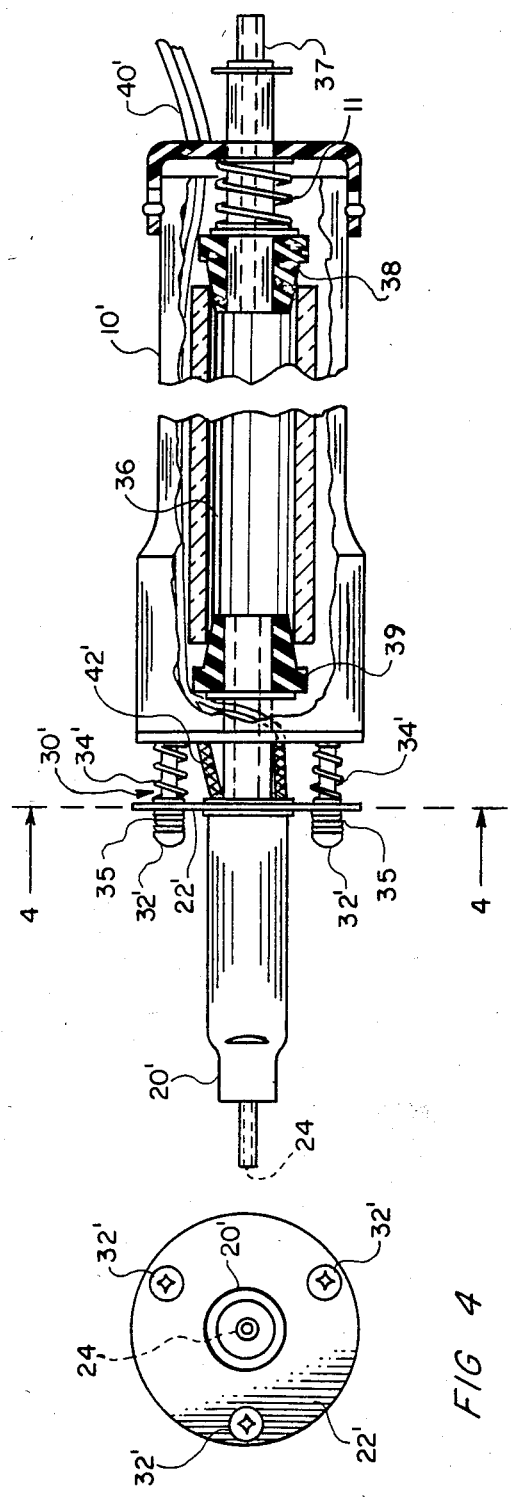

PRESSURE-SENSITIVE ELECTRIC SOLDERING/DESOLDERING TOOL

BACKGROUND OF THE INVENTION

1. Field of the Invention

This invention relates to hand-held tools, and more particularly, to a hand-held electrical tool provided with means for controlling the application of pressure to a workpiece to prevent damage to the work piece.

2. Description of the Prior Art

The operation of soldering and desoldering components on printed circuit boards is highly dependent on the skill and dexterity of the individual operator. Although many variables contribute to successful soldering and desoldering, the most difficult to control is the application of excessive manual pressure during the soldering or desoldering operation.

Single and double-sided printed circuit boards may withstand some abuse, but multilayer printed circuit boards are very susceptible to catastrophic damage from the application of excessive manual pressure such as from soldering and desoldering operations. The application of excessive pressure to circuit pads fractures and pulls away the surface pad from the plated-through hole. Multilayer printed circuit boards valued at several thousand dollars often must be scrapped because of such lifted pads.

The typical hand-held soldering iron and desoldering tool are rigid devices. That is, each has a elongated handle to which is fixedly secured either a soldering tip or a desoldering tip, as the case may be. The application of pressure to the handle by the operator is translated, through the soldering or desoldering tip, directly to the work piece. Such is an undesirable arrangement, indeed, vis-a-vis multilayer circuit boards.

It is, therefore, a principal object of the present invention to overcome this major disadvantage attendant in prior art soldering and desoldering tools and to provide improved apparatus including means for controlling the application of pressure from the hand-held soldering or desoldering tool to the workpiece.

It is a further object of the present invention to provide such a hand-held tool which is provided with a three-point suspension system for flexibly securing the soldering or desoldering tip to the handle thereby allowing excessive pressure to be absorbed by the suspension system before it can damage the workpiece, such as a printed circuit board.

SUMMARY OF THE INVENTION

The above and other objects of the present invention are accomplished by providing apparatus, a pressure-sensitive hand-held tool, having a work head for doing work on a workpiece, and including means for controlling the application of pressure by the work head to the workpiece thereby to prevent damage to the workpiece. In the preferred embodiment, the hand-held tool is of the type having an elongated handle member and the work head is an elongated member secured to one end of the handle normally substantially in coaxial alignment therewith and the means for controlling includes a three-point, spring-loaded suspension arrangement flexibly securing the work head to the handle for allowing excessive pressure being applied to the handle to be taken up by the spring-loaded suspension thereby preventing such excessive pressure from being applied to the workpiece.

BRIEF DESCRIPTION OF THE DRAWING

These and other features of the present invention will be readily apparent from the following description when taken with the accompanying drawing in which:

FIG. 1 shows the preferred embodiment of the present invention as applied particularly to a hand-held soldering iron; and FIG. 2 is a view taken along lines 2—2 of FIG. 1;

FIG. 3 shows another form of the preferred embodiment of the present invention as applied to a handl-held desoldering tool; and FIG. 4 is a view taken along lines 4—4 of FIG. 3.

DESCRIPTION OF THE PREFERRED EMBODIMENT

Referring now to FIGS. 1 and 2 there is shown one form of the preferred embodiment of the improved hand-held tool of the present invention. A hand-held electrical tool is shown in the form of a soldering iron which includes an elongated handle member 10 and an elongated soldering tip 20. Means are provided for controlling the application of pressure by the work head or soldering tip 20 to a workpiece thereby to prevent damage to the workpiece and such takes the form of a three-point, spring-loaded, mechanical suspension arrangement 30 flexibly securing the soldering tip 20 to the handle 10 normally in substantially coaxial alignment therewith. Electrical power for heating the soldering tip 20 is provided through an electrical outlet cord 40 which is connected to the heating element (not shown) of the soldering tip 20 through a flexible electrical wire arrangement 42 in the area of the three-point, spring-loaded suspension arrangement 30.

As can be seen in FIG. 1, the soldering tip 20 is flexibly secured to the handle 10 through a mounting structure which includes a flat plate 22 (FIG. 2) fixedly secured to the soldering tip 20 and which is provided around the periphery with three equally-spaced holes in substantial alignment, respectively, with three tapped holes in a mounting boss 12 formed as a part of the handle 10. Three screws 32 are provided for mounting the soldering tip 20 to the handle 10. Screws 32 are inserted through the holes in flat plate 22. The diameter of the holes is larger than the diameter of screws 32, thereby allowing the screws to move laterally in the holes whenever the applied pressure becomes excessive. Lateral movement of the screws allows the mechanically floating tool tip to deflect from coaxial alignment with handle 10. A spring 34 (only two shown) is threaded over each screw, each screw then being placed into mating engagement with the corresponding tapped hole in the boss 12. The screws 32 are then screwed in so as to compress the respective springs 34 somewhat. As can be seen, such a three-point, spring-loaded suspension arrangement provides a hand-held tool wherein the work head, soldering tip 20, is in substantial coaxial alignment, normally, with the handle 10. However, when excessive pressure is applied to the handle by an operator, the soldering tip 20 is free to deflect away from coaxial alignment with the handle thereby to prevent the application of such excessive pressure to a workpiece being worked on. Such also provides a visual indication to an operator, or for that matter to a supervisor, that excessive pressure is being applied to a workpiece.

Referring now to FIGS. 3 and 4 there is shown another form of the preferred embodiment of the present invention wherein the hand-held tool is a desoldering tool. The desoldering tool includes a elongated handle 10', and an elongated desoldering tip 20'. A three-point, spring-loaded, mechanical suspension arrangement 30' is provided for flexibly securing the desoldering tip 20' to the handle 10' normally in substantially coaxial alignment therewith. As with the soldering iron of FIG. 1, the desoldering tool tip includes a flat plate 22' (FIG. 4) fixedly secured to the desoldering tip 20' and is provided with three holes equally spaced around the periphery thereof in substantial alignment with three tapped holes in the handle 10'. Three screws 32' are inserted through the holes in the plate 22'. The diameter of the holes is greater than the diameter of screws 32' allowing the screws to move laterally in the holes whenever the applied pressure becomes excessive. Lateral movement of the screws in the holes allows the mechanically floating tool tip to deflect from coaxial alignment with handle 10'. A spring 34' is mounted upon each screw (only two are shown), the screws then being screwed in compressing the springs so as to secure the desoldering tip 20' to the handle 10'. A second set of springs 35 may be provided for installation between the head of the screw and the flat plate 22' (again only two are shown) the purpose of which will be discussed hereinafter. Electrical power for heating the desoldering tip 20' is provided through an electrical outlet cord 40' which is connected to the heating element (not shown) of the desoldering tip 20' through a flexible electrical wire arrangement 42' in the area of the three-point, spring-loaded suspension arrangement 30'.

As is typical with most desoldering tools, suction means are provided associated with the desoldering tip 20' for removing from a workpiece solder softened by the desoldering tip. Such takes the form of an aperture 24 in the desoldering tip 20' which extends the full length thereof and communicates with a hollow glass tube 36 which extends substantially the length of the handle and is mounted there within. Glass tube 36 is arranged on the far end of the handle in sealed fashion through a rubber gasket 38 to a nozzle member 37 which may be connected through the use of flexible hose (not shown) to a vacuum source. The glass tube 36 is flexibly sealed to the desoldering tip 20' through a flexible rubber sealing member 39 which is mounted on one end of the desoldering tip 20' and is held in compression through the use of a spring 11 held in place by an end cap 13 secured to the handle 10'.

The second set of springs 35, are each mounted between the head of each screw 32' and the flat plate 22', serve to keep the flexible seal 39 between the desoldering tip 20' and the glass tubing 36 intact as the desoldering tip is deflected when excessive pressure is applied by the operator to the tool.

The invention described and claimed herein has been built and had operated satisfactorily. For the embodiment of FIG. 1, a Hexacon model number 22A soldering iron was purchased and modified as described herein. For the embodiment shown in FIG. 3, a Pace Dual-Path solder extractor model number SX-25 was purchased and modified in accordance with the present invention.

While the invention has been described in terms of a selected preferred embodiment, it should not be deemed limited thereto, since other embodiments and modifications will readily occur to those skilled in the art. It is therefore to be understood that the appended claims are intended to cover all such modifications which fall within the true spirit and scope of the invention.

I claim:

1. A hand-held electrical soldering/desoldering device comprising:
   (a) an elongated handle and an elongated soldering tip element coaxially aligned along a common axis;
   (b) said soldering tip element being attached at one end to a support plate and said support plate having means defining three openings therein located around said common axis of said soldering tip element and handle;
   (c) a three-point, spring-loaded mechanical suspension system disposed between said coaxially aligned soldering tip element and said handle for resiliently securing said soldering tip element to said handle, said system including three support members fixed to said handle and having juxtaposed ends freely passing through said openings in said support plate, said support members including means engaging said support plate to support said soldering tip element and support plate thereon;
   (d) said openings permitting lateral movement of said support members and said handle with respect to said soldering tip element and said support plate whereby said soldering tip element is free to deflect from said common axis when excessive pressure is applied to said handle.

2. The soldering/desoldering device according to claim 1 wherein said three-point, spring-loaded, mechanical suspension system includes compressible spring means located between said handle and said support plate and surrounding said support members.

3. The soldering/desoldering device according to claim 2 wherein said three openings and said three support members are positioned symetrically about said common axis.

4. The soldering/desoldering device according to claim 3 which further includes suction means associated with said soldering tip element and said handle to remove softened solder during desoldering, said suction means being so arranged as not to interfere with the ability of said three-point, spring-loaded, mechanical suspension system to resiliently secure said soldering tip element to said handle.

5. The soldering/desoldering device according to claim 4 wherein said soldering element tip includes a suction bore therein and said suction means is disposed within said handle, said device further includes a flexible fluid coupling member connecting said suction means and said suction bore to permit deflection of said soldering tip element without breaking said fluid coupling member.

6. The soldering/desoldering device according to claim 3 wherein said soldering tip element is electrically heated, said device further including a flexible electrical connection between said handle and said soldering tip element to permit deflection of said soldering tip element without breaking said electrical connection.

* * * * *